(12) United States Patent
Grossman

(10) Patent No.: US 8,659,607 B2
(45) Date of Patent: *Feb. 25, 2014

(54) EFFICIENT VIDEO DECODING MIGRATION FOR MULTIPLE GRAPHICS PROCESSOR SYSTEMS

(71) Applicant: Advanced Micro Devices, Inc., Sunnyvale, CA (US)

(72) Inventor: Mark Grossman, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,230

(22) Filed: Nov. 13, 2012

(65) Prior Publication Data

US 2013/0071097 A1    Mar. 21, 2013

Related U.S. Application Data

(63) Continuation of application No. 11/960,660, filed on Dec. 19, 2007, now Pat. No. 8,330,762.

(51) Int. Cl.
*G06F 15/16* (2006.01)
(52) U.S. Cl.
USPC ........................................ 345/502

(58) Field of Classification Search
USPC ................................. 345/502–506
See application file for complete search history.

(56) References Cited

U.S. PATENT DOCUMENTS

| | | | |
|---|---|---|---|
| 6,115,420 | A | 9/2000 | Wang |
| 6,996,745 | B1 | 2/2006 | Shaylor |
| 7,053,901 | B2 | 5/2006 | Huang et al. |
| 7,456,833 | B1 | 11/2008 | Diard |
| 7,466,316 | B1 | 12/2008 | Alben et al. |
| 7,721,118 | B1 | 5/2010 | Tamasi et al. |
| 2007/0098080 | A1 | 5/2007 | Diard et al. |

*Primary Examiner* — Xiao M. Wu
*Assistant Examiner* — Charles Tseng
(74) *Attorney, Agent, or Firm* — Volpe and Koenig, P.C.

(57) ABSTRACT

A method for switching decoding and rendering of a digital video stream from a first graphics processing unit (GPU) to a second GPU. The digital video stream is evaluated to determine an amount of time until a next intra-coded frame (I-frame) in the digital video stream. If the amount of time is below a threshold, decoding and rendering of the digital video stream is switched to the second GPU on the next I-frame in the digital video stream and decoding the digital video stream by the first GPU is stopped. If the amount of time is above the threshold, the digital video stream is decoded on both the first GPU and the second GPU, the rendering of the digital video stream is switched to the second GPU, and decoding the digital video stream by the first GPU is stopped.

20 Claims, 7 Drawing Sheets

500

| 502 | 504 | 506 |
|---|---|---|
| NEXT FRAME TYPE | CONDITION | RULE ACTION |
| I | | Send stream to GPU2 from next I-frame, decode I-frame at GPU2 |
| P | Previous frame was an I-frame | Send stream to GPU2 starting with previous I-frame, decode I-frame at GPU2, decode new P-frame at GPU2 |
| P | Previous frame was a P-frame and time to next I-frame is less than threshold | Continue decoding on GPU1, send stream to GPU2 starting with next I-frame |
| P | Previous frame was a P-frame and time to next I-frame is greater than threshold | Copy previous decoded P-frame to GPU2, decode new P-frame at GPU2 |
| B | This B-frame is based on an I-frame | Send stream to GPU2 starting with I-frame, decode I-frame and B-frame at GPU2 |
| B | Not based on I-frame and time to next I-frame is greater than threshold and copy is very fast relative to decode process | Copy stream starting with two reference frames to GPU2, and decode new B-frame at GPU2 |
| B | Not based on I-frame and time to next I-frame is long and copy is somewhat fast relative to decode process | Copy first decoded reference frame to GPU2, send stream to GPU2 starting with second reference frame to GPU2, decode second reference frame to GPU2, decode B-frame at GPU2 |

FIG. 5

EFFICIENT VIDEO DECODING MIGRATION FOR MULTIPLE GRAPHICS PROCESSOR SYSTEMS

CROSS REFERENCE TO RELATED APPLICATION

This application is a continuation of U.S. patent application Ser. No. 11/960,660, filed Dec. 19, 2007, issued as U.S. Pat. No. 8,330,762, issued on Dec. 11, 2012, which is incorporated by reference as if fully set forth herein.

TECHNICAL FIELD

The disclosed embodiments relate generally to graphics processors, and more specifically to methods and apparatus for efficient switching of video content in multiple graphics processor systems.

BACKGROUND OF THE DISCLOSURE

Many types of digital video playback systems (also known as digital content servers) are based on multiple video decoding engines or graphics processors that provide video streams to one or more users. Such systems may provide different video streams to different users, or different types of video data to the same user or group of users. They may also provide redundant functionality so that when one engine or processor fails or shuts down, another processor may take over and provide the video stream to the user without interruption.

Digital video systems may employ one or more graphics processing units (GPU) to process video data. A GPU is a graphics and video rendering device for computers, workstations, game consoles, and similar digital processing devices. A GPU is usually implemented as a coprocessor component to the central processing unit (CPU) of the computer, and may be provided in the form of an add-in card (e.g., video card), co-processor, or as functionality that is integrated directly into the motherboard of the computer or into other devices (such as, for example, Northbridge devices and CPUs).

Given the amount of data that may be present in a video stream, most digital graphics processing systems employ some form of compressed or coded representation of moving picture and audio data to reduce the storage and processing overhead associate with video data processing. One of the most popular worldwide standards is the MPEG (Motion Pictures Coding Experts Group) standard, which comprises several different variations for both audio and video data. MPEG-based systems basically encode the original data sequence and then decode the encoded sequence upon playback to reduce the amount of data that needs to be stored and processed, compared to simple storage of each frame of a video sequence. Rather than storing individual pixel information, MPEG encoding stores the movement of objects within images, thus taking advantage of the fact that much information in a video sequence is redundant and only small parts of an image typically change from frame to frame. In processing a video stream, the MPEG encoder produces three types of coded frames. The first type of frame is called an "I" frame or intra-coded frame. This is the simplest type of frame and is a coded representation of a still image. In general, no processing is performed on I-frames; their purpose is to provide the decoder a starting point for decoding the next set of frames. The next type of frame is called a "P" frame or predicted frame. Upon decoding, P-frames are created from information contained within the previous P-frames or I-frames. The third type of frame, and the most common type, is the "B" frame or bi-directional frame. B-frames are both forward and backward predicted and are constructed from the last and the next P or I-frame. Both P-frames and B-frames are inter-coded frames.

Using such a techniques, substantial savings can be gained in file sizes, and typical MPEG systems provide video compression ratios in the range of 8:1 to 30:1. Although data storage requirements are greatly reduced for encoded data streams, a certain amount of processing is required to decode the video data in an MPEG system. This decoding, as well as subsequent rendering of video frames, is often performed by decoding circuitry in a GPU. In a typical multi-GPU (Graphics Processing Unit) based system, each GPU has its own dedicated memory that stores partially decoded video frames. In certain cases, a playback stream may need to be migrated from one GPU to another, such as when a GPU experiences a processing fault or requires maintenance. Similarly, in load-balancing systems, playback streams may be moved from heavily loaded processors to less heavily loaded processors. In many present digital video systems, migration of playback streams from one processor to another requires moving the code from one GPU memory to the next GPU memory. If the migration is done immediately, there may typically be a large amount of state data that must be moved to the new processor's memory, and may include previously decoded frames. This type of failure recovery or redundancy system is inefficient since it can consume significant time and processing bandwidth. For example, the same amount of memory may be consumed for the second processor as for the first processor to store the migrated video data, and the second processor may need to decode the same frame data. What is needed, therefore, is an efficient video data migration system for decoding frame data on multiple graphic processing devices.

BRIEF DESCRIPTION OF THE DRAWINGS

Embodiments are illustrated by way of example and not limitation in the figures of the accompanying drawings, in which like references indicate similar elements and in which:

FIG. 5 is a table that illustrates the conditional logic rules for migrating a video stream from a first GPU to a second GPU when data to a previous I-frame is not available, under an embodiment;

DETAILED DESCRIPTION

Embodiments of the invention as described herein provide a solution to the problems of conventional methods as stated above. In the following description, various examples are given for illustration, but none are intended to be limiting. Embodiments include a frame processor module in a graphics processing system that examines the intra-coded and inter-coded frames in an encoded video stream and initiates migration of decoding and rendering functions to a second graphics processor from a first graphics processor based on the location of intra-coded frames in a video stream and the composition of intermediate inter-coded frames.

Figure 1:
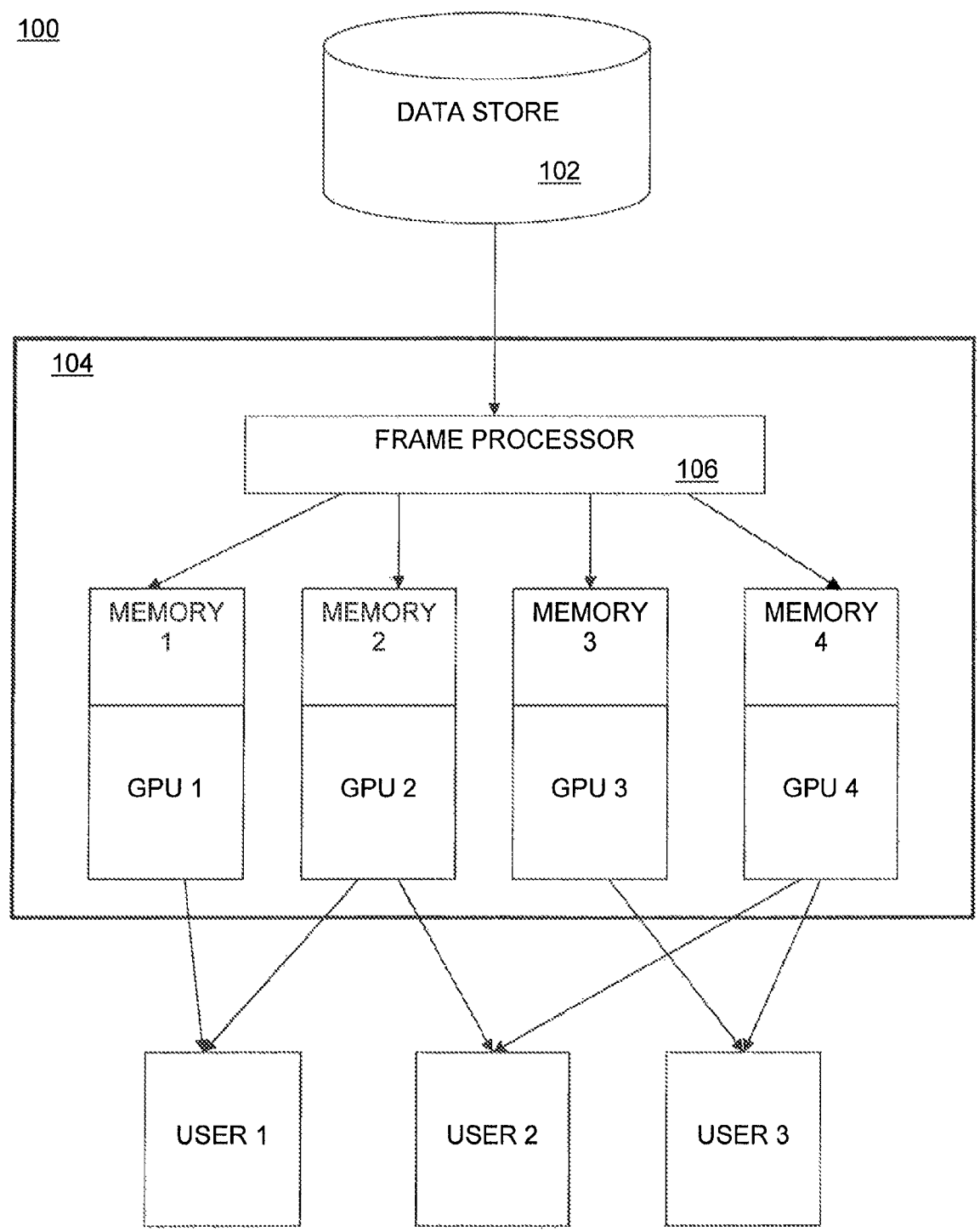
FIG. 1 illustrates a block diagram of a digital video processing system implementing a video decoding migration system, under an embodiment.

FIG. 1 illustrates a block diagram of a digital video processing system implementing a video decoding migration system, under an embodiment. For the video system 100 of FIG. 1, a data store 102 stores one or more video streams or clips in the form of compressed or encoded data that is provided by a compression component that processed raw video data from a source, such as a camcorder, digital media (e.g., DVD) or any other digital video source. This compressed data is provided to video processor 104, which contains a number of graphics processing units, denoted GPU 1-4, although any number can be provided. Each GPU has associated with it a respective memory component, denoted Memory 1-4. The respective memory devices can be closely coupled to the corresponding GPUs, or this memory can represent dedicated portions of a memory store.

The GPU units can provide video streams to one or more users, denoted Users 1-3, and can be any type of video decoding accelerator or processing unit that processes digital video data. The distribution of output video streams to the users can be performed by a common output stage for video processing unit 104 or through output stages that are individually provided by each GPU. Typically the video stream for one given user is supplied by a single GPU at any given time. The users are connected to the video processing unit 104 output stage using a suitable analog or digital interconnection such as video cable, Ethernet, and so on.

For the embodiment illustrated in FIG. 1, video processing system 104 includes a frame processor component 106. This component receives and manages the encoded data streams from data store 102 for processing by the individual GPUs. It also manages the migration of locally stored video data from one GPU memory to another GPU memory during video migration operations. Such migration operations may be required in several different operational situations, such as in the event of failure of one or more of the GPUs, routine maintenance or upgrade of a GPU or GPU software, or balancing the load among different GPUs. Thus, for example, if GPU1 serving User1 were to be taken out of service, its video stream would be taken over and provided by GPU2. In this case, any locally stored video data in Memory1 would be migrated to Memory2 for use by GPU2. In this way, the video stream is continuously provided to User1 despite the unavailability of GPU1. The frame processor component 106 is configured to provide an efficient method of migrating decoded or partially decoded video frames from the first memory to the second memory so that migration of the video stream can occur with minimal delay, and subsequent processing by the second GPU can occur as seamlessly as possible.

In one embodiment, the video processing system 104 may be implemented in a computer processing system, such as a workstation or personal computer. Data store 102 may be a local disk storage unit coupled directly to the computer, or remotely coupled to the computer over a network. The interface to the users 1-3 may be provided by user interfaces that couple the video processing system 104 to an external network. Likewise frame processor 106 may be implemented as a dedicated program running on the CPU of the computer processing system.

In one embodiment, the encoded video data stored in data store 102, is encoded using an MPEG encoding technique. An MPEG encoded video stream comprises a number of frames, each containing the movement vectors of objects within the original video stream. Each GPU contains a decoder circuit that reconstructs each frame from the known movement vectors and the previous or next frame data. In MPEG video encoding a group of pictures (GOP) specifies the order in which intra-coded frames (I-frames) and inter-coded frames (B-frames and P-frames) are arranged. The GOP is a group of successive pictures within a MPEG-coded film and/or video stream. Each MPEG-coded film and/or video stream consists of successive GOPs. Visible frames are generated from the MPEG pictures contained in it. A GOP contains I-frames (intra-coded picture), which are reference pictures that correspond to fixed images and are independent of other picture types; P-frames (predictive coded picture) contains motion-compensated difference information from the preceding I or P-frame; and B-frames (bidirectionally predictive coded pictures), which contain difference information from the preceding and/or following I-frame or P-frame. Depending upon the level of MPEG implementation, other frames may also be present, such as D-frame (DC direct coded picture) which facilitates fast advance functions.

Figure 2:
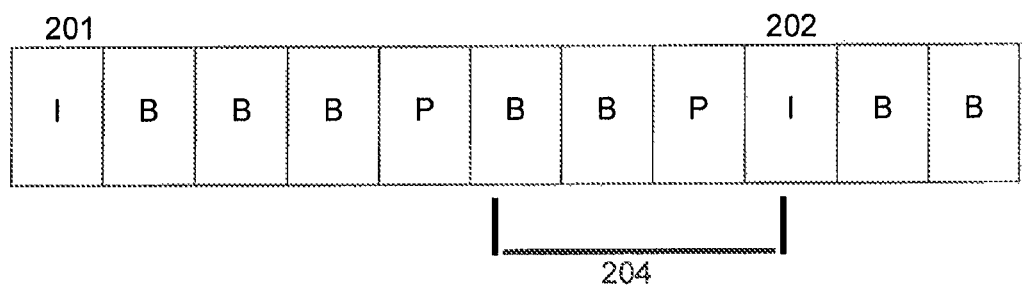
FIG. 2 illustrates a block of frames in a video playback stream processed by a video decoding migration system, under an embodiment.

Each GOP begins with an I-frame, followed by several P-frames, with some frame distance between and B-frames in the gaps. Each successive I-frame begins a new GOP. FIG. 2 illustrates a block of frames in a video playback stream processed by a video decoding migration system, under an embodiment. For the example of FIG. 2, stream 200 consists of a first GOP structure of IBBBPBBP starting with I-frame 201, followed by second GOP structure, IBB starting with I-frame 202. FIG. 2 illustrates an example of a relatively short GOP structure, since most typical systems, every 15th frame or so is made into an I-frame, although GOP lengths may vary depending upon implementation. The I-frames contain the full image of the source frame, and therefore, do not require any additional information to reconstruct the image for that frame. That is, an I-frame is a compressed version of a single uncompressed (raw) frame, and unlike P-frames and B-frames, they do not depend on data in the preceding or the following frames. In general each raw frame is divided into 8-pixel by 8-pixel blocks. The data in each block is transformed by a discrete cosine transform. The result is an 8 by 8 matrix of coefficients. The transform converts spatial variations into frequency variations, but it does not change the information in the block; the original block can be recreated exactly by applying the inverse cosine transform. This allows the image to be simplified by quantizing the coefficients. Many of the coefficients, usually the higher frequency components, will then be zero. Next, the quantized coefficient matrix is itself compressed. Typically, one corner of the quantized matrix is filled with zeros. By starting in the opposite corner of the matrix, then zigzagging through the matrix to combine the coefficients into a string, then substituting run-length codes for consecutive zeros in that string, and then applying Huffman coding to that result, one reduces the matrix to a smaller array of numbers. It is this array that is broadcast or that is put onto the digital media. In the receiver or the player, the whole process is reversed, enabling the receiver to reconstruct, to a close approximation, the original frame.

During video migration in which a video stream comprising GOP blocks is moved from one GPU memory to a second GPU memory in a multi-GPU system, it is important to ensure that sufficient frames for a block are copied to the second memory. Since the I-frames contain the full image and do not require additional information, any errors in the streams are corrected by the next I-frame, that is, an error in the I-frame propagates to the next I-frame. Errors in the P-frames propagate until the next anchor frame, but B-frames do not propagate error. Unlike I-frames, both P-frames and B-frames require information about other frames. Because these frames of the stream 200 require information about other frames, a sufficient number of frames must be copied from the first memory to the second memory, otherwise proper decoding for that GOP will not be possible. The greater the number of frames that are required to be copied, the greater the storage and processing overhead required for the second GPU. If the number of frames exceeds a threshold number based on the processing capability of the system, playback on the second GPU may not be continuous enough to result in a seamless transfer of the video feed from the first GPU to the second GPU. In this case, the user may see a momentary glitch or other interruption during the switch between the GPUs.

In one embodiment, the frame processor component 106 initiates decoding of the copied GOP on the second GPU in advance of switch from the first GPU. For this embodiment, the second GPU receives an indication that a switch from the first GPU will be necessary and will occur within a certain time period. The second GPU then determines how much of the current stream needs to be copied and decoded based on the position of present and successive I-frames within the stream. It starts the decoding process in advance of the switch, such that when the switch occurs, it has already decoded the requisite blocks and can provide the video stream directly without interruption. This implementation assumes that the graphic processors decode the video data faster than the playback speed. The second GPU analyzes or receives information regarding the current GOP block being processed by the first GPU and determines the number of frames in the GOP to decode based on the position of the I-frame. The GPU may perform this function internally. Alternatively, the video processor 104 may include an additional processor or a function within frame processor 106 that keeps track of the location of I-frames within the video stream for use by the second GPU. This eliminates the need for the GPU to monitor itself the position of the I-frames within the stream. In one embodiment, the frame processor is configured to store a portion of the video stream, or at least a recent history of frames, such as back to the beginning of a GOP. This video stream portion could be stored in a central memory or in one or all of the respective GPU memories.

If the switch from the first GPU to the second GPU is scheduled to occur on an I-frame, migration of the video stream to the second GPU is straightforward. In this case, the second GPU receives the data stream from this I-frame and begins decoding and rendering video immediately upon receiving this I-frame. The second GPU is generally configured to receive the same encoded video stream as the first GPU as it is provided by data store 102 through frame processor 106. Logic circuitry is provided within each GPU or by a component within video processing system 104 to enable the second GPU to receive the same stream as the first GPU starting at any point depending upon the location of the I-frames, and the nature of the frames between successive I-frames. If the switch to the second GPU does not occur on an I-frame, but instead occurs on a P-frame or B-frame, the frame processor component 106 must perform some logic functions to effect the migration of the video stream from the first GPU to the second GPU.

Figure 3:
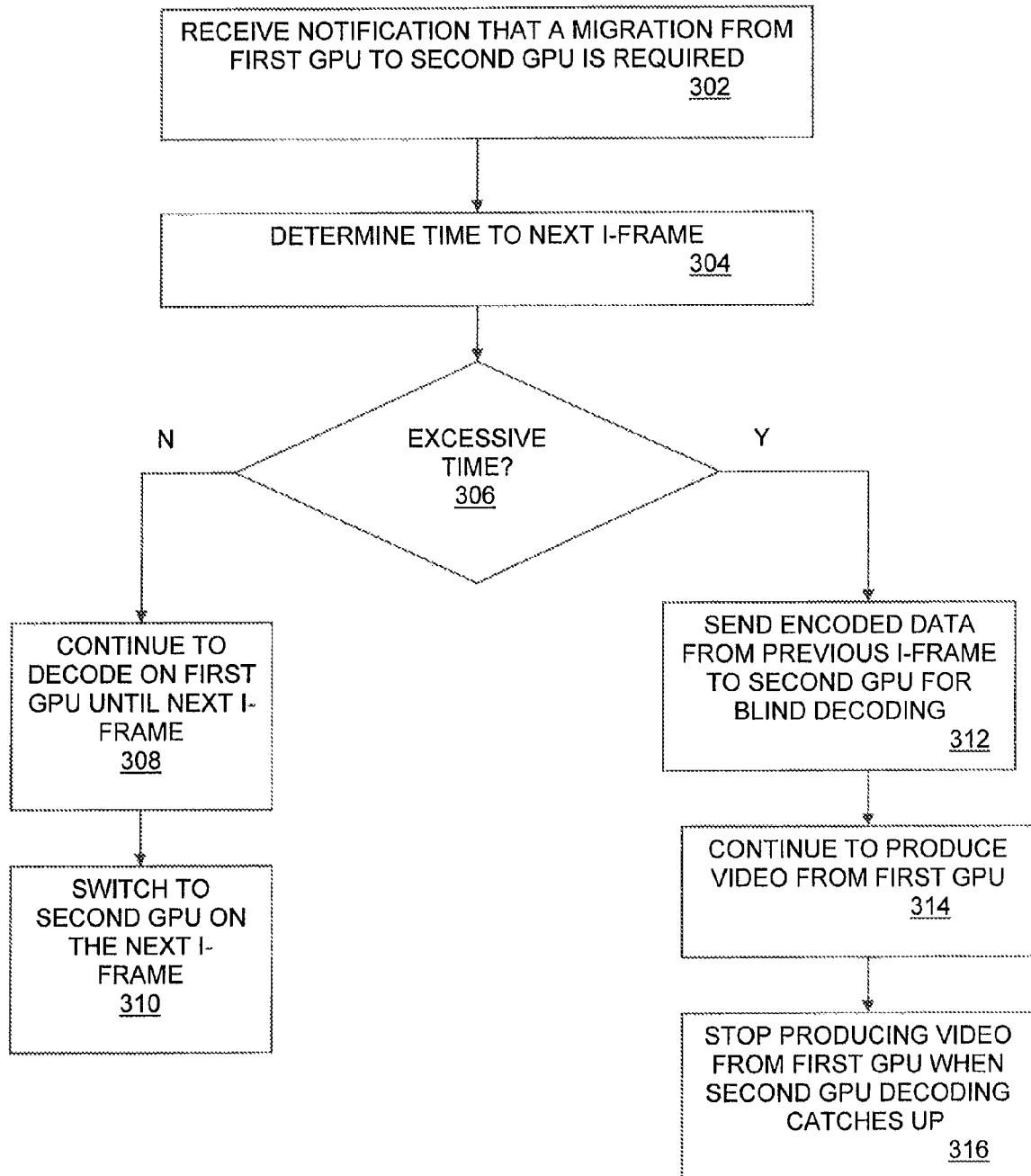
FIG. 3 is a flowchart that illustrates a method of performing migration of frames in a video playback stream using an efficient migration system, under an embodiment.

FIG. 3 is a flowchart that illustrates a method of performing migration of frames in a video playback stream using an efficient migration system, under an embodiment. In block 302 the second, or any next available GPU (GPU2) receives notification that a migration of a video stream from the first GPU (GPU1) is required. This notification may come from a monitor that is external to the video processing system 104, or it may be a signal that is provided by frame processor 106 or similar decoder within video processing system 104. The notification is typically triggered in response to a scheduled event that forces GPU1 to shut down, or due to insufficient bandwidth in GPU1. This notification system provides a certain amount of time (on the order of seconds or minutes) of warning to GPU2 regarding the impending switch. In the case of an unscheduled or unexpected failure of GPU1, the use of a pre-storage buffer may help provide adequate time for GPU2 to start processing data for GPU1 before it is played back, even after GPU1 is unavailable.

After GPU1 received notification of the migration of the playback stream from GPU1, it examines the present GOP block being processed by GPU1 and determines the amount of time or number of frames until the next I-frame 202 within the stream 200. A threshold amount of time 204 is defined by the system to dictate whether GPU2 should start decoding the current GOP block. In block 306, the system determines if there is too much time to the next I-frame 202 as defined by the threshold value 204. If an acceptably small amount of time exists until the next I-frame, GPU1 continues to decode the current GOP block until the next I-frame is reached, block 308. When the next I-frame is reached, the stream is then migrated to GPU2, which begins decoding the video stream from this new GOP, block 310. In one embodiment, GPU2 begins decoding this new GOP block only if P-frames follow the new I-frame, and not if B-frames follow.

If, in block 306 it is determined that the time to the next I-frame exceeds the threshold value 204, the system determines whether encoded data to the previous I-frame 201 is available. If it is, these frames are sent to GPU2 for blind decoding, which is decoding where no rendering is required, block 312. As shown in block 314, GPU1 continues to produce video as GPU2 decodes the frames received in block 312. Due to the speed of the decoding process by GPU2 in block 312 compared to the video rendering process of GPU1 in block 314, GPU2 will decode more quickly than GPU1 will produce video. When GPU2 decodes enough of the stream so that it is concurrent with the section produced by GPU1, the data stream is migrated to GPU2, and GPU1 is stopped, block 316. At this point, GPU2 now decodes the stream for rendering, and subsequently produces the video for the user.

Figure 4:
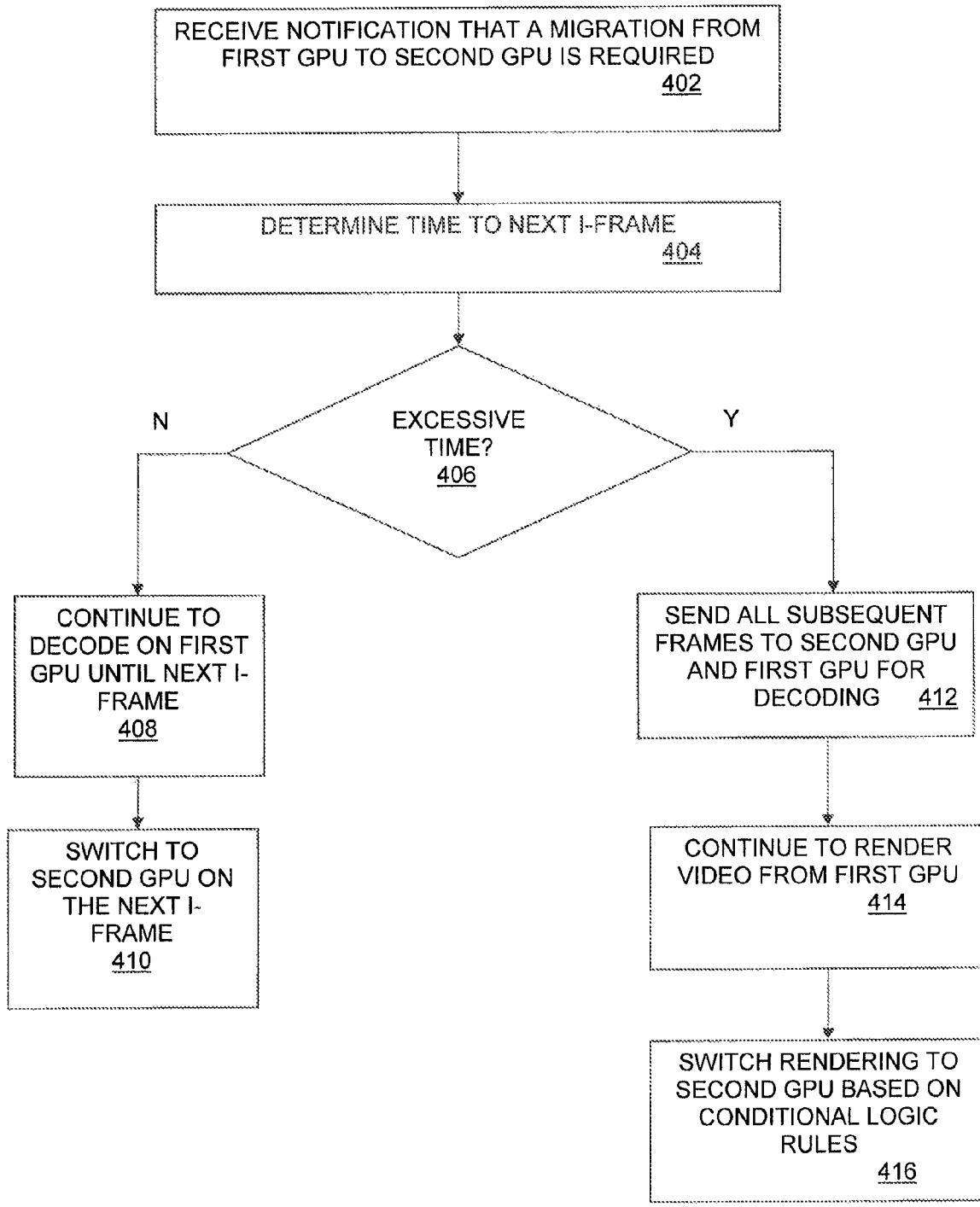
FIG. 4 is a flowchart that illustrates a method of performing migration of frames in a video playback stream using an efficient migration system, under an alternative embodiment.

As shown in block 312, the method of FIG. 3 requires that data back to the first I-frame 201 must be available for blind decoding by GPU2. If this data is not available, then the GPU2 must start decoding this GOP beginning with the initial I-frame 201. In this description, the term "reference frame" can mean either an I-frame or a P-frame. FIG. 4 is a flowchart that illustrates a method of performing migration of frames in a video playback stream using an efficient migration system, under an alternative embodiment in which encoded data back to the previous I-frame is not available. In block 402 the GPU2 receives notification that a migration of a video stream from the first GPU 1. After GPU1 received notification of the migration of the playback stream from GPU1, it examines the present GOP block being processed by GPU1 and determines the amount of time or number of frames until the next I-frame 202 within the stream 200, block 404. In block 406, the system determines if there is too much time to the next I-frame 202 as defined by the threshold value 204. If an acceptably small amount of time exists until the next I-frame, GPU1 continues to decode the current GOP block until the next I-frame is reached, block 408. When the next I-frame is reached, the stream is then migrated to GPU2, which begins decoding the video stream from this new GOP, block 410.

If, in block 406 it is determined that the time to the next I-frame exceeds the threshold value 204, and if encoded data to the previous I-frame 201 is not available, all frames after the initial I-frame 201 are sent in parallel to both GPU1 and GPU2 for decoding, block 412. As shown in block 414, GPU1 continues to produce video as GPU2 decodes the frames received in block 412. The rendering is then switched to the GPU2 in accordance with certain conditional logic rules. An example of such conditional logic rules is provided in FIG. 5.

FIG. 5 is a table that illustrates the conditional logic rules for migrating a video stream from a first GPU to a second GPU when data to a previous I-frame is not available, under an embodiment. Table 500 of FIG. 5 comprises three columns 502, 504, and 506. Column 502 specifies the type of the next frame in the stream to decode, column 504 specifies the context or condition of the next frame in relation to previous and/or subsequent frames, and column 506 specifies the action to be taken by the system based on the next frame type and condition information. In one embodiment, the action steps of column 506 along with the next frame type 502 and conditions 504 are encoded in a set of logic rules that are executed by the GPUs in graphics system 104.

As shown in FIG. 5, the case in which the next frame to decode is an I-frame is a relatively simple case in which the video stream is sent to the second GPU starting with this I-frame, and the second GPU then decodes this and all subsequent frames. In the case where the next frame is a P-frame or B-frame, migration of the stream to the second GPU further depends on certain threshold time considerations.

Figure 6:
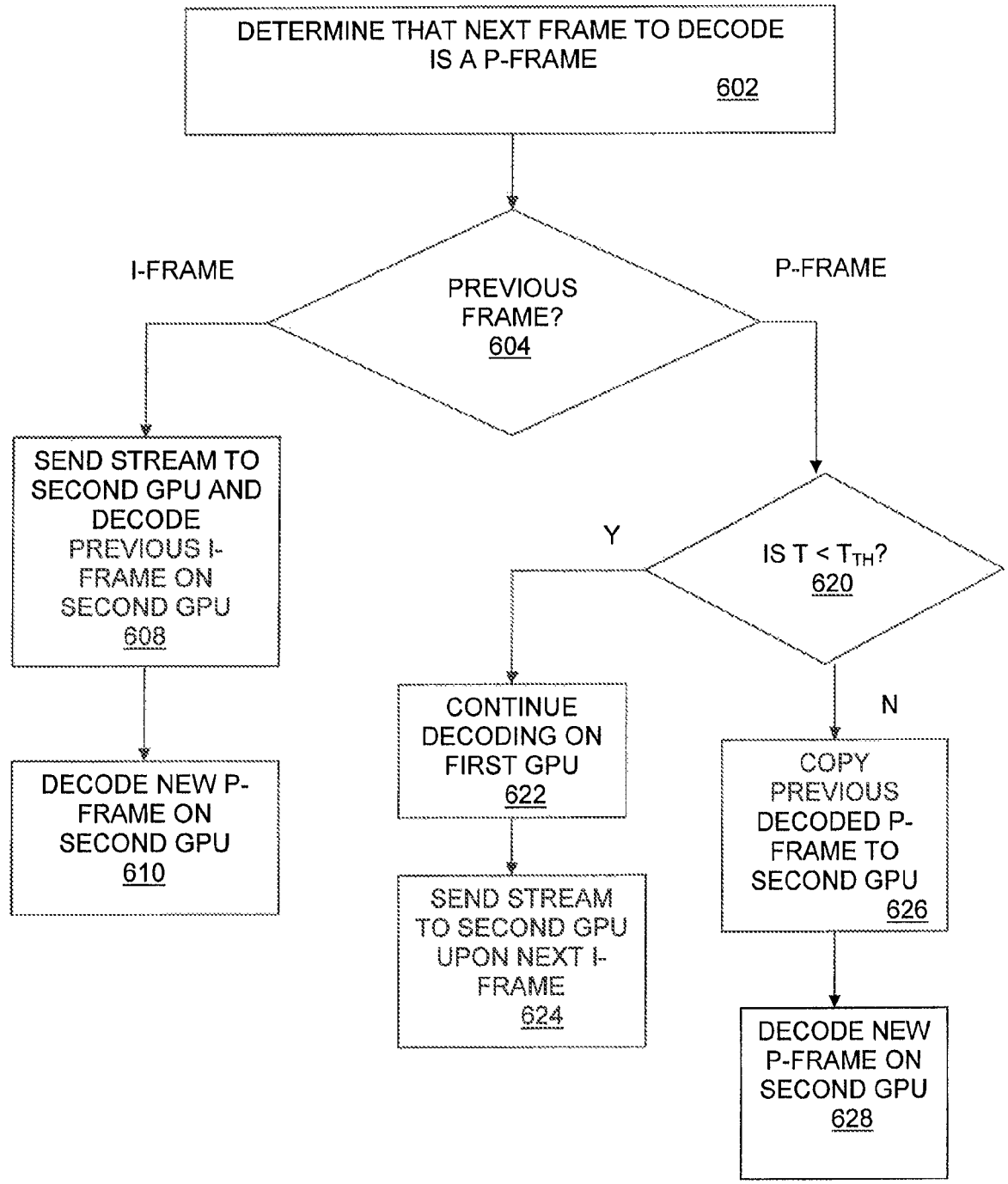
FIG. 6 is a flowchart that illustrates the step of migrating a video stream from a first GPU to a second GPU when the next frame is a P-frame, under an embodiment.
Figure 7:
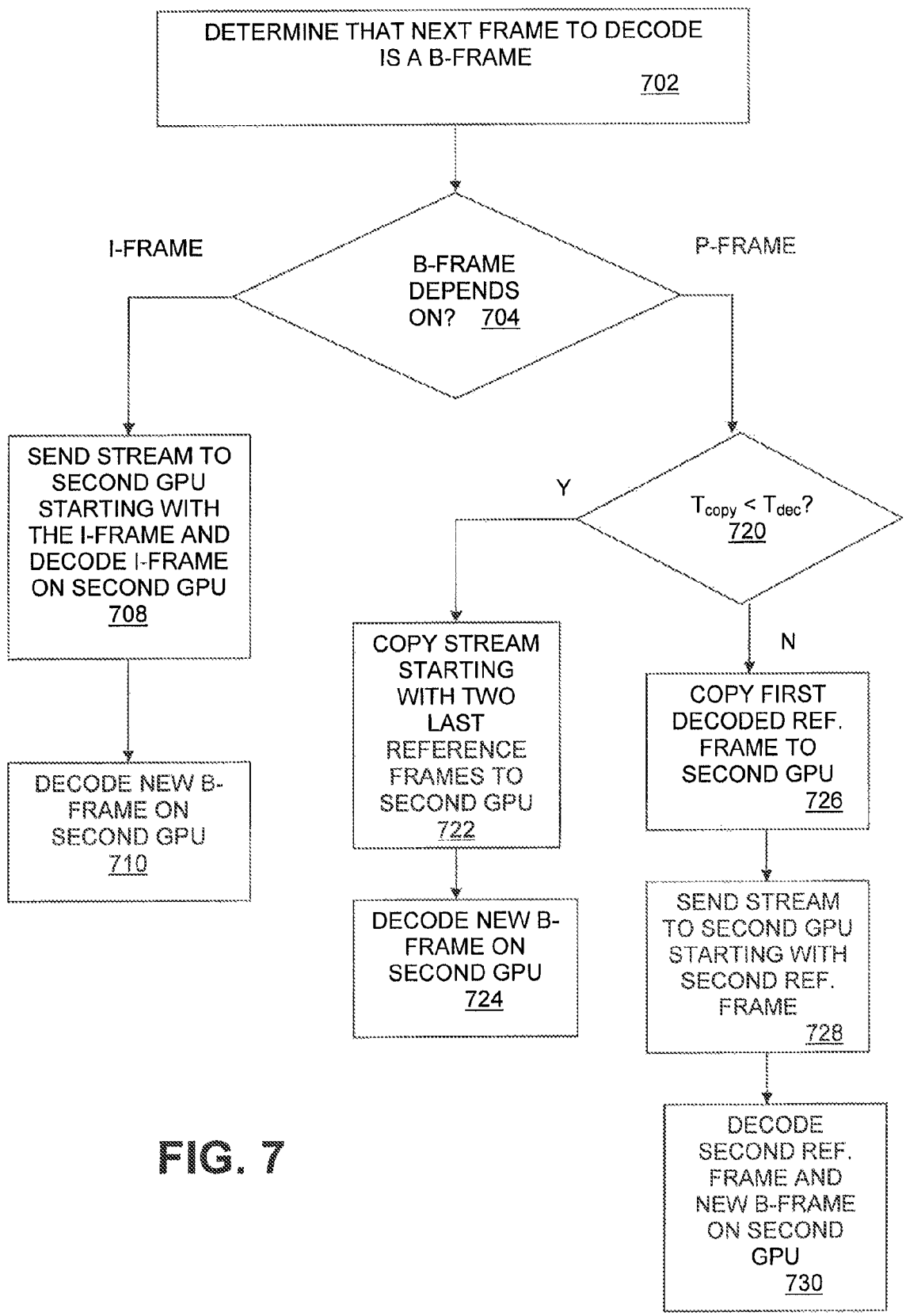
FIG. 7 is a flowchart that illustrates the step of migrating a video stream from a first GPU to a second GPU when the next frame is a B-frame, under an embodiment.

FIGS. 6 and 7 are flowcharts that illustrate the process of migration to the second GPU for a next P-frame or B-frame based on the logic rules of FIG. 5.

FIG. 6 is a flowchart that illustrates the step of migrating a video stream from a first GPU to a second GPU when the next frame is a P-frame, under an embodiment. As shown in block 602, the process starts with the determination that the next frame in the stream to decode is a P-frame. The frame type of the previous frame of the stream is then determined in block 604. If the previous frame was an I-frame, the video stream is sent to the second GPU starting with this previous I-frame, and the previous I-frame is decoded on the second GPU, block 608. The new P-frame from block 602 is then decoded on the second GPU, block 610. If, in block 604, it is determined that the previous frame was a P-frame, the time to the next I-frame is determined, block 620. This time is compared to a defined threshold time ($T_{th}$) that is used to characterize whether the time to the next I frame is relatively long or short. If the time to the next I-frame is less than the threshold time, then the system continues to decode the stream on the first GPU, block 622. The video stream is then sent to the second GPU starting with the next I-frame, block 624. If, in block 620 it is determined that the time to the next I-frame is greater than or equal to the threshold time, then the previously decoded P-frame is copied to the second GPU, block 626, and the new P-frame from block 602 is decoded on the second GPU, block 628.

FIG. 7 is a flowchart that illustrates the step of migrating a video stream from a first GPU to a second GPU when the next frame is a B-frame, under an embodiment. As shown in block 702, the process starts with the determination that the next frame in the stream to decode is a B-frame. The type of frame that the B-frame depends on is then determined in block 704. If the next B-frame is based on a previous I-frame, the video stream is sent to the second GPU starting with this previous I-frame, and the previous I-frame is decoded on the second GPU, block 708. The B-frame from block 702 is then decoded on the second GPU block 710. If, in block 704, it is determined that the next B-frame does not depend on an I-frame, and the time to the next I-frame is equal to or greater to the threshold time, defined above, that is, the time to the next I-frame is relatively long, then the time difference between decoding the frame ($T_{dec}$) is compared to the time required to copy the stream ($T_{copy}$) to the second GPU, block 620. The time difference is generally characterized in terms of whether the time to the copy the stream is very fast or only relatively fast (medium fast) relative to the decode time. If the time required to copy the stream is very fast relative to the decode time (denoted $T_{copy} < T_{dec}$), then the system copies the two previously decoded reference frames (I or P-frames), block 722. The new B-frame from block 702 is then decoded on the second GPU, block 724. If, in block 720 it is determined that the time required to copy the stream is only medium fast (or slow) relative to the decode time, then the first decoded reference frame used by the B-frame is copied to the second GPU, block 726. The system then sends the video stream to the second GPU starting with the second reference frame used by the new B-frame, block 728. The second reference frame and the new B-frame are then decoded on the second GPU, block 730.

The embodiments described herein disclose a system in which migration of video data from a first GPU to a second GPU is accomplished through intelligent decoding of frames synchronized between the two GPUs, rather than simple copying of GOP data from the first GPU memory to the second GPU memory. By examining the composition of the GOP with reference to the location of the I-frames, and the definition of a threshold time to the successive I-frame, the system is able to effectively initiate decoding in the second GPU so that when the first GPU is shut down, the second GPU can take over video rendering with minimum delay.

Embodiments can be directed to enable migration between two GPUs for frames other than or in addition to the standard I-frames, P-frames, and B-frames. Examples of such frames include video rendering frames that control quality characteristics such as color enhancement, pixel resolution, filtering, and so on.

Embodiments can be used with any type of MPEG system, such as MPEG-1 or MPEG-2, which is widely used as the format of digital television signals that are broadcast by terrestrial, cable, and direct broadcast systems, as well as for the format of movies and other content that is distributed on DVD and similar disks, or using the VC-1 and H.264 standards. Embodiments may be used for one-way video transmissions over a data network, such as used on the Web as well as private intranets to deliver video-on-demand or a video broadcast. Such streaming video may be played within a few seconds of requesting it, unlike movie files (MPG, AVI, etc.) that are played after they are downloaded, and the data is not stored permanently in the computer. The streaming video may broadcast live, such as in "realtime" video feeds. Embodiments may also be directed to real-time two-way transmission systems, such as used in videoconferencing, and similar systems.

The embodiments described herein improve the efficiency of decoded video data migration in multi-GPU video processing systems. Embodiments may be provided as software drivers that control operation of the GPU, or it may be provided as functionality coded directly into the GPU.

Although embodiments have been described with reference to graphics systems comprising GPU devices or visual processing units (VPU), which are dedicated or integrated graphics rendering devices for a processing system, it should be noted that such embodiments can also be used for many other types of video production engines that are used in parallel. Such video production engines may be implemented in the form of discrete video generators, such as digital projectors, or they may be electronic circuitry provided in the form of separate IC (integrated circuit) devices or as add-on cards for video-based computer systems.

In one embodiment, the system including the GPU control system comprises a computing device that is selected from the group consisting of: a personal computer, a workstation, a handheld computing device, a digital television, a media playback device, smart communication device, and a game console, or any other similar processing device.

Aspects of the system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects of the video stream migration system may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the video stream migration system is not intended to be exhaustive or to limit the embodiments to the precise form or instructions disclosed. While specific embodiments of, and examples for, processes in graphic processing units or ASICs are described herein for illustrative purposes, various equivalent modifications are possible within the scope of the disclosed methods and structures, as those skilled in the relevant art will recognize.

The elements and acts of the various embodiments described above can be combined to provide further embodiments. These and other changes can be made to the disclosed system in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed embodiments are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventor reserves the right to add additional claims after filing the application to pursue such additional claim forms for other aspects.

What is claimed is:

1. A method for switching decoding and rendering of a digital video stream from a first graphics processing unit (GPU) to a second GPU, comprising:
   evaluating the digital video stream to determine an amount of time until a next intra-coded frame (I-frame) in the digital video stream;
   if the amount of time is below a threshold,
      switching decoding and rendering of the digital video stream to the second GPU on the next I-frame in the digital video stream; and
      stopping decoding the digital video stream by the first GPU; and if the amount of time is above the threshold,
      decoding the digital video stream on both the first GPU and the second GPU;
      switching the rendering of the digital video stream to the second GPU; and
      stopping decoding the digital video stream by the first GPU.

2. The method according to claim 1, wherein the switching the rendering of the digital video stream to the second GPU is performed when the second GPU is decoding a same frame as the first GPU.

3. The method according to claim 1, wherein the switching the rendering of the digital video stream to the second GPU is performed based on conditional logic rules.

4. The method according to claim 3, wherein if a next frame in the digital video stream is a predictive coded frame (new P-frame) and if a frame before the new P-frame is an I-frame (previous I-frame), the switching the rendering of the digital video stream to the second GPU includes:
   decoding the previous I-frame on the second GPU; and
   decoding and rendering the new P-frame on the second GPU.

5. The method according to claim 3, wherein if a next frame in the digital video stream is a predictive coded frame (new P-frame) and if a frame before the new P-frame is another P-frame (previous P-frame), the switching the rendering of the digital video stream to the second GPU includes:
   if a time to a next I-frame in the digital video stream is less than a second threshold, switching the decoding and rendering of the digital video stream to the second GPU on the next I-frame in the digital video stream; and
   if the time to the next I-frame in the digital video stream is greater than the second threshold,
     copying the previous P-frame to the second GPU; and
     decoding and rendering the new P-frame on the second GPU.

6. The method according to claim 3, wherein if a next frame in the digital video stream is a bidirectionally predictive coded frame (B-frame) and the B-frame depends on an I-frame (previous I-frame), the switching the rendering of the digital video stream to the second GPU includes:
   sending the digital video stream, beginning with the previous I-frame, to the second GPU for decoding; and
   decoding and rendering the B-frame on the second GPU.

7. The method according to claim 3, wherein if a next frame in the digital video stream is a bidirectionally predictive coded frame (B-frame) and the B-frame depends on a predictive coded frame (previous P-frame), the switching the rendering of the digital video stream to the second GPU includes:
   if a time to copy the digital video stream to the second GPU is less than a time to decode the B-frame,
     copying two previously decoded reference frames to the second GPU; and
     decoding and rendering the B-frame on the second GPU; and
   if the time to copy the digital video stream to the second GPU is greater than the time to decode the B-frame,
     copying one previously decoded reference frame to the second GPU;
     sending the digital video stream to the second GPU, starting with a second reference frame; and
     decoding and rendering the second reference frame and the B-frame on the second GPU.

8. The method according to claim 1, further comprising:
   receiving a notification at the second GPU of switching the digital video stream from the first GPU.

9. The method according to claim 8, wherein the notification is generated based on a trigger event, the trigger event including any one of: a failure of the first GPU, scheduled maintenance of the first GPU, or excessive bandwidth consumption by the first GPU.

10. An apparatus for decoding and rendering a digital video stream, comprising:
   a plurality of graphics processing units (GPUs), each GPU configured to decode and render the digital video stream; and
   a frame processing component, configured to:
     send the digital video stream to a first GPU, wherein the first GPU decodes and renders the digital video stream;
     evaluate the digital video stream to determine an amount of time until a next intra-coded frame (I-frame) in the digital video stream;
     if the amount of time is below a threshold,
       switch decoding and rendering of the digital video stream to the second GPU on the next I-frame in the digital video stream; and
       stop decoding the digital video stream by the first GPU; and
     if the amount of time is above the threshold,
       send the digital video stream to the second GPU, wherein the digital video stream is decoded by both the first GPU and the second GPU;
       switch the rendering of the digital video stream to the second GPU; and
       stop decoding the digital video stream by the first GPU.

11. The apparatus according to claim 10, wherein the frame processing component is further configured to switch the rendering of the digital video stream to the second GPU when the second GPU is decoding a same frame as the first GPU.

12. The apparatus according to claim 10, wherein the frame processing component is further configured to switch the rendering of the digital video stream to the second GPU based on conditional logic rules.

13. The apparatus according to claim 12, wherein if a next frame in the digital video stream is a predictive coded frame (new P-frame) and if a frame before the new P-frame is an I-frame (previous I-frame), the frame processing component is further configured to:
   send the previous I-frame to the second GPU for decoding; and
   switch the decoding and rendering of the new P-frame to the second GPU.

14. The apparatus according to claim 12, wherein if a next frame in the digital video stream is a predictive coded frame (new P-frame) and if a frame before the new P-frame is another P-frame (previous P-frame), the frame processing component is further configured to:
   if a time to a next I-frame in the digital video stream is less than a second threshold, switch the decoding and rendering of the digital video stream to the second GPU on the next I-frame in the digital video stream; and
   if the time to the next I-frame in the digital video stream is greater than the second threshold,
     copy the previous P-frame to the second GPU; and
     switch the decoding and rendering of the new P-frame to the second GPU.

15. The apparatus according to claim 12, wherein if a next frame in the digital video stream is a bidirectionally predictive coded frame (B-frame) and the B-frame depends on an I-frame (previous I-frame), the frame processing component is further configured to:
   send the digital video stream, beginning with the previous I-frame, to the second GPU for decoding; and
   switch the decoding and rendering of the B-frame to the second GPU.

16. The apparatus according to claim 12, wherein if a next frame in the digital video stream is a bidirectionally predictive coded frame (B-frame) and the B-frame depends on a predictive coded frame (previous P-frame), the frame processing component is further configured to:
   if a time to copy the digital video stream to the second GPU is less than a time to decode the B-frame,
     copy two previously decoded reference frames to the second GPU; and
     switch the decoding and rendering of the B-frame to the second GPU; and
   if the time to copy the digital video stream to the second GPU is greater than the time to decode the B-frame,
     copy one previously decoded reference frame to the second GPU;
     send the digital video stream to the second GPU, starting with a second reference frame; and
     switch the decoding and rendering of the second reference frame and the B-frame to the second GPU.

17. The apparatus according to claim 10, wherein the frame processing component is further configured to send a notification to the second GPU of switching the digital video stream from the first GPU.

18. The apparatus according to claim 17, wherein the notification is generated based on a trigger event, the trigger event including any one of: a failure of the first GPU, scheduled maintenance of the first GPU, or excessive bandwidth consumption by the first GPU.

19. A non-transitory computer-readable storage medium storing a set of instructions for execution by a general purpose computer to switch decoding and rendering of a digital video stream from a first graphics processing unit (GPU) to a second GPU, the set of instructions comprising:

an evaluating code segment for evaluating the digital video stream to determine an amount of time until a next intra-coded frame (I-frame) in the digital video stream;

a first switching code segment for switching decoding and rendering of the digital video stream to the second GPU on the next I-frame in the digital video stream, the first switching code segment being used if the amount of time is below a threshold;

a decoding code segment for decoding the digital video stream on both the first GPU and the second GPU, the decoding code segment being used if the amount of time is above the threshold;

a second switching code segment for switching the rendering of the digital video stream to the second GPU, the second switching code segment being used if the amount of time is above the threshold; and a stopping code segment for stopping decoding the digital video stream by the first GPU.

20. The non-transitory computer-readable storage medium according to claim 19, wherein the instructions are hardware description language (HDL) instructions used for the manufacture of a device.

\* \* \* \* \*